United States Patent [19]
Patel

[11] Patent Number: 5,918,191
[45] Date of Patent: Jun. 29, 1999

[54] SYSTEM AND METHOD FOR MANAGING DATA FOR AN EQUIPMENT CALIBRATION LABORATORY

[75] Inventor: Tracy L. Patel, Warner Robbins, Ga.

[73] Assignee: Certified Measurements, Inc., Centerville, Ga.

[21] Appl. No.: 08/818,787

[22] Filed: Mar. 11, 1997

[51] Int. Cl.$^6$ .................................................. G06F 17/30
[52] U.S. Cl. ..................... 702/84; 702/118; 702/121; 702/122; 702/100; 702/104
[58] Field of Search .................... 364/571.01–571.08, 364/550, 551.01, 552, 554; 707/103, 104, 102, 100, 101; 702/55–91, 183–185, 117–119, 121–123; 379/112–113

[56] References Cited

U.S. PATENT DOCUMENTS

| | | | |
|---|---|---|---|
| 4,404,639 | 9/1983 | McCuire et al. | 364/551 |
| 4,841,456 | 6/1989 | Hogan, Jr. et al. | 702/122 |
| 4,878,179 | 10/1989 | Tal | 364/490 |
| 4,967,381 | 10/1990 | Lane et al. | 364/551.01 |
| 5,021,997 | 6/1991 | Archie et al. | 364/900 |
| 5,245,554 | 9/1993 | Tsuyama et al. | 364/552 |
| 5,265,247 | 11/1993 | Wiench et al. | 395/600 |
| 5,333,183 | 7/1994 | Herbert | 379/112 |
| 5,392,209 | 2/1995 | Eason et al. | 364/413.01 |
| 5,551,022 | 8/1996 | Tariq et al. | 395/600 |
| 5,625,816 | 4/1997 | Burdick et al. | 364/489 |
| 5,657,252 | 8/1997 | George | 364/550 |

*Primary Examiner*—John Barlow
*Assistant Examiner*—Bryan Bui
*Attorney, Agent, or Firm*—Morris, Menning & Martin, L.L.P.

[57] ABSTRACT

A system and method for managing data in calibration laboratory is disclosed. The system includes a database server, a database management system (DBMS) executing on the database server, and at least one client program coupled to the DBMS through a communication network. The client program queries the DBMS for data and sends data to the DBMS for storage on a database managed by the DBMS. The database managed by the DBMS includes at least an equipment tracking table and a work order table that may link a plurality of work orders in the work order table to a single equipment record in the equipment tracking table. This structure reduces the need for multiple identifications of a test instrument in the database. In a preferred implementation of the present invention, technical data records in a technical data table and administrative data records in an administrative data table are separately linked to a work order record in the work order table. In this way, the administrative data and technical data in the system are separately maintained. In another aspect of the preferred implementation, a standards used table contains standards used records which are linked to a work order record in the work order table to identify the calibration standards used for a calibration job on a test instrument. This structure facilitates measurement traceability for a test instrument. In a most preferred aspect of the system, an automated calibration procedure (ACP) program is implemented to use operating system interface commands for transferring data collected during a calibration procedure to the client program. The client program them sends the collected data to the DBMS for storage in the database. In the most preferred implementation, the ACP and client program use a Dynamic Data Exchange (DDE) of the Windows operating system to transfer collected data from the ACP to the client program.

25 Claims, 6 Drawing Sheets

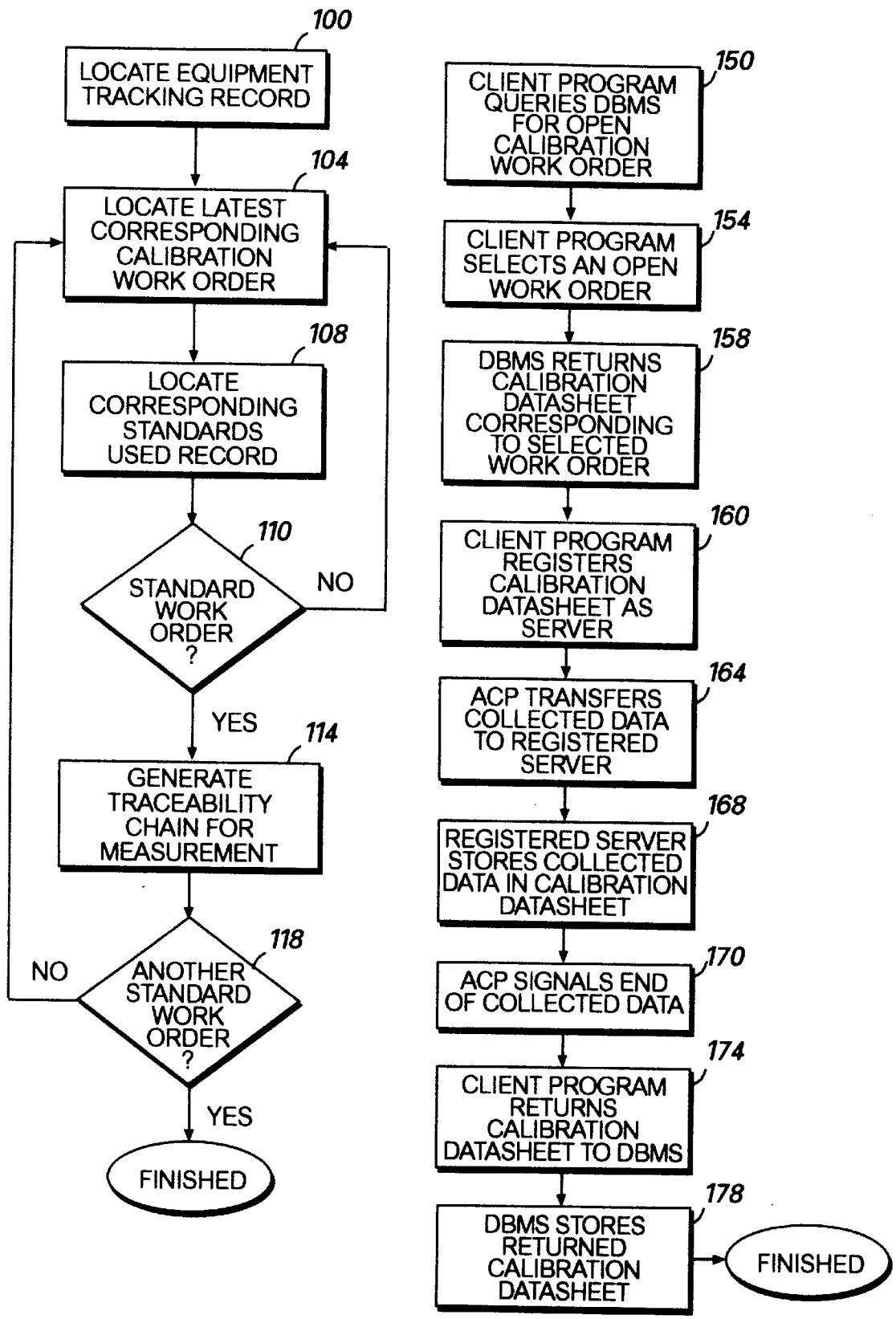

SYSTEM AND METHOD FOR MANAGING DATA FOR AN EQUIPMENT CALIBRATION LABORATORY

FIELD OF THE INVENTION

This invention relates to the management of calibration data for equipment, and more particularly, to job tracking and measurement traceability for an equipment calibration laboratory.

BACKGROUND OF THE INVENTION

Scientific testing, measuring, and diagnostic instruments are used in many industrial applications. Typically, these instruments are used to verify the accuracy of production equipment or verify the assembly of produced goods. The instruments used for this verification must also be periodically tested to ensure that they are operating correctly and yielding valid and accurate measurements. Typically, these instruments are sent to equipment calibration laboratories where measurements obtained from instruments are compared to those obtained from standards to see if the instruments are measuring within predefined specifications. The calibration laboratory may be an independent laboratory operated by a third party or it may be a laboratory operated by the user of the instruments. If an instrument is not within the predefined specifications, the testing technician attempts to adjust the instrument to bring it in compliance with the predefined specifications. Instruments sent to a calibration laboratory for testing are called test instruments in this document and those instruments used to test other instruments are called calibration standards.

The calibration standards used at calibration laboratories must also be verified against other calibration standards until the verification chain ends at a calibration standard of industry recognized authority such as those available from the National Institute of Standards and Technology ("NIST"). The calibration standards maintained at NIST are sometimes referred to as the "golden mean." While "golden mean" and NIST standard are used throughout this document to describe industry recognized standards for verifying equipment accuracy, the reader should appreciate that these terms include any industry recognized standard in any country which is used for such verification. Thus, if a company wants to verify the accuracy of the test instruments that it uses to produce goods or that it uses to verify the quality of its goods, it needs to be able to trace verification of its test instruments back to a "golden mean." Usually, this is accomplished by the records maintained at the calibration laboratory where the company's test instruments are serviced.

In previously known systems used to track data at calibration laboratories, the systems track all of the information on a work order basis. That is, as each test instrument is received at a calibration laboratory, a work order record is generated and assigned a work order number. Included in the work order record are data which identify the company or entity which sent the equipment to the calibration laboratory for calibration, the address and other relevant information regarding the company, equipment data such as the manufacturer and serial number, and other data which may be used to identify the equipment at the time it is received. For example, this other data may include asset numbers assigned by the customer to internally track the equipment at the customer's facility.

After this initial data are collected and stored in a work order record, the equipment is sent to a technician who performs a calibration procedure for testing the accuracy of the equipment. Calibration standards are equipment used by a technician at the calibration laboratory to test and verify the accuracy of test instruments sent to the laboratory for calibration. Calibration standards are verified against NIST standards or the like so test instruments can eventually be traced to a NIST standard, as discussed more fully below. The measurement data obtained from a test instrument and the calibration standards used to perform the measurements are stored in the work order record. If the test instrument is out of calibration, the technician performs an adjustment to bring the test instrument within the predefined specifications for the test instrument. The measurement data obtained once the unit has been adjusted to be within the predefined specifications are also recorded in the work order record. These known data management systems then print a calibration certificate using the data stored in the work order record. The equipment and calibration certificate are then sent to shipping so the equipment may be returned to the customer. Typically, shipping uses the work order number on the calibration certificate to obtain the work order record which identifies the customer and the address to which the equipment is to be sent. Finally, accounting uses the work order record to generate invoices for the services identified in the work order record and these invoices are sent to the customer at the address identified in the work order record.

These previously known laboratory management systems group all the different types of data associated with one calibration service for one test instrument in one record. When a test instrument is returned to the calibration laboratory for subsequent calibration, information is needed to locate the prior work order record because tracking the history of the calibration jobs is important to show the equipment has been properly maintained. In previously known systems, this may not be possible for a number of reasons. For one, data is usually manually entered at each stage of the calibration process in previously known systems. Thus, spelling errors and other typographical errors may be introduced into the records. These errors may subsequently prevent identification of a prior work order record when the equipment is returned to the calibration laboratory.

Another problem with known laboratory data management systems is that information used to identify the equipment may change. For example, the equipment being used by a customer may be associated with a contract which the customer is performing for another entity. If that contract terminates or the equipment is transferred to another contract also being performed by the customer, the asset number used to identify the equipment may change. If the asset number is being used to locate work order records previously performed on a test instrument, those records may not be located because the data field used to locate the data records has changed. As a result, the calibration history for the test instrument may be broken. This broken history is a result of being able to have multiple identifications of a single test instrument in the system as a result of data entry errors or typical changes in equipment identification.

What is needed is a laboratory management system which reduces the likelihood that equipment will be identified more than once so that job history integrity is maintained.

During performance of the calibration procedure, data related to the response of the test instrument is stored along with data about the calibration standard and the test instrument. The data collected usually includes the calibration and expiration dates for the calibration standards used during the calibration procedure, the date of the calibration procedure, and the date the test instrument next needs calibration. This type of information is also recorded each time a calibration standard is calibrated. Thus, one can use this information to identify the standards used to calibrate a test instrument and the corresponding information for the identified calibration standards to eventually trace the calibration of a test instrument to an industry recognized standard. The process of generating a report which contains the information to trace a test instrument measurement to an industry recognized standard is called measurement traceability.

In most calibration laboratories, there are two types of calibration standards—primary standards and transfer standards. Primary standards are calibration standards which are typically verified against industry accepted standards such as NIST standards. Transfer standards are calibration standards which have been verified against primary standards. In previously known calibration laboratory data management systems, each work order for calibration of a test instrument sent by a customer, the calibration standards used, the measurements obtained in the calibration procedure, and the date each standard was last calibrated are recorded on the calibration certificate and stored in the work order record.

To trace a calibration measurement of a test instrument to an industry recognized standard, the calibration certificate may be located in a manual search or from a work order record maintained in an automated system. The standards used for the calibration and the corresponding calibration date for each standard is obtained from the certificate or work order record. In previously known systems, a separate calibration standard file is maintained which includes a date for each calibration of each standard, the standards used at each calibration date to calibrate the standard, and the corresponding calibration date for each laboratory or NIST standard used to calibrate the standard. Thus, in a manual classification system, the calibration certificate for the test instrument is first located, then the calibration certificates for each of the standards used to calibrate the test instrument are then retrieved according to calibration date and the process continues for each of those standards until a certificate is located for each standard which indicates the standard was calibrated against an industry recognized standard such as a NIST standard. A manual search to collect calibration certificates is very labor intensive and expensive.

In previously known automated calibration laboratory data management systems, the work order records must first be searched to locate the latest work order for a test instrument. That record identifies the standards and their calibration dates which were used to calibrate the test instrument. Then the calibration date information is used to search the calibration standard file to locate a record for each standard, and in turn, continue looking for records within the calibration standard file by calibration date which correspond to the laboratory or NIST standards used to calibrate standards. This process continues until a laboratory standard in the chain indicates it was verified against a NIST standard.

There are a number of problems with using previously known automated calibration laboratory data management systems to trace calibration standards to a NIST standard. For one, there is the separate maintenance of both a work order database and a calibration standards database. To effectively trace the calibration of a test instrument, a user, either manually or through an automated interface, must use calibration date information from the work order database to search the calibration standards database. The location of work order records is again subject to the typographical errors and equipment identification changes discussed above. Additionally, the identification of a standard in the work order record may differ from the identification of the calibration standard in the calibration standard database because of typographical errors and other data entry errors.

Another problem which occurs in the tracing of the standards arises from the use of the calibration date to locate information about a calibration standard. Situations may arise where one calibration standard may be used to calibrate a second calibration standard and then the second calibration standard is used to calibrate the first calibration standard on the same day. For example, a calibration standard oscillator may be used to calibrate the frequency sensitivity of a calibration standard frequency counter. Once the frequency counter is calibrated, the oscillator is recorded as the standard used to calibrate the standard frequency counter. The counter may then be used to calibrate the oscillator frequency output and the counter is correspondingly recorded as a standard used to calibrate the standard oscillator. Because known automated tracing systems search for the standard identifier of a standard used to calibrate a test instrument and its most recent calibration date, the system fails to locate the correct calibration standard record or gets caught in a loop. For instance, in the example presented above, use of the frequency counter to calibrate a test instrument results in a trace which first locates the most recent calibration record for the frequency counter. Because the oscillator was used to calibrate the frequency counter, the calibration record for the oscillator is located. Processing the calibration record for the oscillator causes the system to return to the frequency counter calibration record because it was used to calibrate the oscillator on the same day. This loop continues as the system would continuously search for the calibration record for the standard frequency counter used to calibrate the standard oscillator and then return to the standard counter record, which returns to the standard oscillator record, and so on indefinitely.

What is needed is an automated laboratory management system which reduces the likelihood that the system loops endlessly when tracking the traceability of calibration standards calibrated by other calibration standards.

What is needed is a system which reduces the need for the maintenance of separate databases for test instruments and calibration standards.

Another area of interest in the calibration laboratory field is the use of statistics to analyze and characterize a population of measurement data. A population of measurement data is a group of like measurements, for example, a collection of measured values for a large number of resistance calibrations. The statistical analysis of a population of data depends on the size and distribution of the population. The collection of a population of data is difficult in known laboratory management systems as the form of the measurement data as stored in these systems is not necessarily standardized. Without this standardization, it is difficult to ascertain which measurement data stored in a system are alike.

One area of important statistical analysis is predictive maintenance scheduling. Predictive maintenance refers to analysis based on the period of calibration and the data collected at calibration service. The object of this scheduling is to predict a next calibration date for a test instrument at which the test instrument will still be in calibration and which also provides the longest period of service for the test instrument. A long service period for a test instrument is important as calibration service involves both the cost for the calibration service and the time that the test instrument is not available for productive work. Thus, a goal of predictive maintenance scheduling is to extend the dates between calibration servicing of a test instrument as much as possible. However, this goal must be balanced against the need for the test instrument to remain within calibration during the entire service period. Otherwise, an issue arises as to whether the equipment or goods verified by the test instrument are accurate. For example, if a standard is determined to be out of calibration at a calibration service for the standard, then each test instrument that was calibrated with the standard since the last calibration service for the standard was possibly inaccurately calibrated. As a result, the calibration laboratory must analyze the impact of the out of tolerance condition and possibly issue a recall to re-calibrate each test instrument calibrated with the standard. This, in turn, may require the customers owning the recalled equipment to issue recalls or perform field service to re-verify equipment verified with the recalled equipment.

Predictive scheduling analysis requires a significant body of measurement data regarding the period of time between calibration dates for equipment and the measurement data values obtained at the calibration dates. While it appears that such information would be available from previously known automated laboratory data management systems, the retrieval of measurement data from such systems is problematic. One difficulty in obtaining data from previously known automated laboratory management systems is the inconsistency of equipment identification in the work order records noted above. Thus, an attempt to retrieve all information related to a particular type of equipment may result in the inaccurate collection of data because some of the work order records may be improperly omitted. Such omissions may arise from typographical errors in the equipment identification in the work order record which causes the record to appear as not corresponding to the type of equipment to be analyzed.

What is needed is a system which facilitates the collection of technical data for all pieces of equipment which correspond to a particular type.

What is needed is a system which reduces the likelihood that technical data for a relevant test instrument will be omitted from a population of data required for some statistical data analysis.

In an effort to facilitate the tasks of a laboratory technician in collecting and analyzing data to calibrate equipment, automated calibration procedures (ACPs) have been developed. ACPs are computer programs, either available from third party vendors or custom development sources, which either perform a calibration procedure and collect measurement data or step a technician through a calibration procedure and prompt the technician for data generated during the performance of the procedure. The data collected by an ACP is stored in files on the computer executing the ACP. While the ACP facilitates a technician's tasks, it produces a file of calibration data which is not part of known automated laboratory management systems. However, known automated laboratory management systems require the technical data collected by an ACP to perform a variety of tasks. For example, known automated laboratory management systems generate certificates of calibration which require customer identification and technical data from the calibration service. To address the need of known automated laboratory management systems for technical data from an ACP, methods for transferring data files from ACPs to known automated laboratory management systems have been developed. Typically, the file transport programs which implement these methods require the conversion of the data from the format in which it is stored on the ACP computer to a compatible format for an automated laboratory management system. Additionally, transfers using these methods are performed after all of the data has been collected for a calibration procedure by an ACP and stored in a file by the ACP.

The known methods for transferring data files from an ACP to known automated laboratory management systems have a number of limitations. For one, any time a laboratory considers acquiring a new ACP, it must verify that the format of the data generated by the ACP can be converted by the file transport program used for the laboratory management system. As a result, a laboratory may be limited in the ACP programs it may consider. The alternative of developing or buying another file transport program to support an ACP is both expensive and time consuming. For another, file transport programs are used to transport files generated by an ACP after one or more calibration procedures are performed. The process of stopping between procedures to activate a file transport program, monitor the transfer, and then resume calibration servicing of equipment is time intensive and denigrates the productivity of the technician. Consequently, a laboratory may address this issue by using a file transport to transfer many files from one or more ACPs at a time in a batch mode operation. However, this extends the time required for the transfer operation. Additionally, the time that the technical data remains on the ACP, it is separated from the laboratory management system and may be corrupted before a file transfer can occur.

What is needed is a laboratory management system that accepts technical data from an ACP without requiring a file transport program. What is needed is a laboratory management system that can collect technical data from an ACP while a calibration procedure is being performed.

SUMMARY OF THE INVENTION

The above limitations of previously known automated laboratory management systems are overcome by a system and method practiced in accordance with the principles of the present invention. The system of the present invention includes an equipment tracking table for storing equipment tracking records, each equipment tracking record having an unique equipment identifier for each test instrument serviced by a calibration laboratory and a work order table for storing calibration work order records having at least a calibration work order identifier that uniquely identifies a calibration job performed by the calibration laboratory, a plurality of the calibration work order records being linked to one of the unique identifiers for one of the test instruments seviced by the calibration laboratory so that equipment identification data for a test instrument is only entered once in the system for all calibration jobs performed on the test instrument. As a result, multiple identifications of a test instrument are less likely and job history integrity for the piece of equipment is better maintained.

In this type of system, each test instrument which is calibrated by a calibration laboratory only has one record which identifies the test instrument in the database. In the preferred embodiment of the present invention, the equipment tracking table includes the unique test instrument identifier, identifier for the owner of the test instrument, a descriptive noun for the test instrument, identification of the manufacturer of the test instrument, model numbers for the test instrument, the serial number for the test instrument, any customer assigned asset number, or other information which may be obtained at the time the test instrument is serviced by the calibration laboratory for the first time. Thereafter, when a test instrument is received at the calibration laboratory, the receiving clerk may enter any or all of this data which the receiving clerk perceives from the equipment and the system searches the equipment tracking table to locate one or more records which may correspond to the information entered into the system. The clerk may then review the information in the retrieved records to select the equipment tracking record which best corresponds to the information available to the clerk. In this manner, no information regarding the test instrument is entered into the system if the clerk identifies that the test instrument has already been registered in the database. Thus, the likelihood of multiple equipment identification records for one test instrument and the opportunities to enter erroneous data is reduced. If the clerk identifies the test instrument as being one not previously serviced by the laboratory, the clerk is given an opportunity to verify the accuracy of the information entered into an equipment tracking form presented to the clerk by the system. Once the clerk verifies the equipment identification data, the system assigns a unique identifier to the equipment identification and stores the equipment tracking record in the equipment tracking table.

After the system has located an unique identifier for a test instrument or assigned a new unique identifier for a test instrument, a work order identifier is generated for the calibration service of test instrument. The one-to-many relationship of the single equipment tracking record to multiple work order identifiers helps maintain job history integrity for each test instrument stored in the database. The work order identifier is also used to link the equipment tracking record to technical data obtained during the calibration procedure and administrative data used to process the test instrument through the laboratory. Preferably, this is achieved by storing technical data as it is generated during the calibration process in a technical data table while customer data is located in an administrative data table. Both the technical data table and customer data table are linked to the work order table which is linked to the equipment tracking table. Preferably, the administrative data table is populated with data about a customer when a test instrument is first identified. In this manner, the administrative data is not entered for subsequent calibration procedures performed for any test instrument previously processed by the calibration laboratory. Thus, the system of the present invention reduces the likelihood of erroneous data being entered in the system because technicians in the calibration laboratories need only enter the technical data obtained during a calibration procedure. The segregation of administrative data and technical data into separate tables helps ensure that administrative data is not corrupted because a technician or clerk does not have to enter the administrative data each time a test instrument is serviced.

In another inventive aspect of the present invention, calibration standards for the calibration laboratory may be entered and maintained in the system of the present invention. To facilitate measurement traceability, a standards used table is linked to each work order record. The standards used table identifies, by work order identifier, each standard used to calibrate the test instrument linked to a work order record. Preferably, each calibration standard is entered in the system as if it is a test instrument. A corresponding work order record is generated for each laboratory calibration standard and linked to a standard used table. By recursively following the standards used table and work order records until an endpoint is identified, standards for test instrument measurements can be completely traced without reference to date information. This reduces the likelihood of endless looping by the system.

In another preferred aspect of the present invention, the system also includes a test, measuring and diagnostic (TMDE) table. The TMDE table is also linked to the equipment tracking table and includes data elements identifying generic aspects of a test instrument. For example, the TMDE table may include a manufacturer identifier, model number, noun identifier and other information which is common for each individual test instrument which conforms to the generic description. Information particular to each individual test instrument, such as serial number, asset number, and other more specific identification information is stored and maintained in the equipment tracking table. Because the TMDE table is linked to the equipment tracking table and this table is linked to the work order table which is linked to both the administrative data and technical data tables, the TMDE data table may be used to relate technical data for all test instruments which conform to a generic description or general class stored in a TMDE record. The structure of the inventive system permits technical data for a particular manufacturer and model to be more easily acquired and this data may be used to build an empirical database which may be analyzed to more accurately predict calibration scheduling dates.

In another aspect of the present invention, an ACP having a real-time interface is provided. The ACP is implemented to store data to the real-time interface rather than a file while a calibration procedure is being performed. In a preferred implementation of the present invention, the real-time interface includes a work order identifier, the location where data from an ACP is to be placed, and a data transfer field. The ACP selects a work order identifier for an open work order on the system which corresponds to the test instrument on which the ACP is to perform the calibration procedure. Thereafter, the ACP provides data in the data transfer field and identifies a location where the data is to be placed for the work order identifier assigned to it. When the calibration is complete, the ACP provides a procedure complete signal so the system stores the data in the data locations in a technical data table linked to the work order identifier.

In the most preferred implementation of the present invention, the ACP is implemented to use the Dynamic Data Exchange (DDE) of a Windows operating system to transfer data from the ACP. In this embodiment, a transfer program operates as a DDE server on the computer which is executing the ACP. The ACP acts as a client to the DDE server and transfers collected data through the DDE of the Windows operating system on the computer executing both the ACP and DDE server. In response to the DBMS providing the transfer program a calibration data form corresponding to an open work order on the system, the transfer program registers the calibration data form corresponding to the open work order as a DDE server. As data is collected by the ACP, it places the data in a transfer data field defined in the DDE along with the work order identifier and the location where the data is to be placed in the calibration form of the corresponding DDE server. The DDE of the Windows operating system provides the data and data location to the corresponding DDE server. When the ACP signals that data collection is complete, the calibration form and data in it are stored in the technical data records which are linked to the work order identifier.

The ACP with a real-time interface permits the system of the present invention to collect data from an ACP during a calibration procedure. This reduces the risk of corrupted data and eliminates the need for file transport programs. Additionally, by using the DDE interface of a Windows operating system, ACPs may use known DDE commands to transfer technical data to the system of the present invention without the need to develop a complete technical data transfer protocol.

These and other objects and advantages of the present invention shall be made apparent from the accompanying drawings and the description thereof.

BRIEF DESCRIPTION OF THE DRAWINGS

The accompanying drawings, which are incorporated nd constitute a part of the specification, illustrate preferred and alternative embodiments of the present invention and, together with a general description given above and the detailed description of the embodiments given below, serve to explain the principles of the present invention.

FIG. 5 is a flowchart of an exemplary process to trace laboratory standards using the system of FIG. 1;

FIG. 10 is a flowchart of an exemplary process for implementing the real-time interface of FIG. 9.

DETAILED DESCRIPTION OF THE INVENTION

Figure 1:
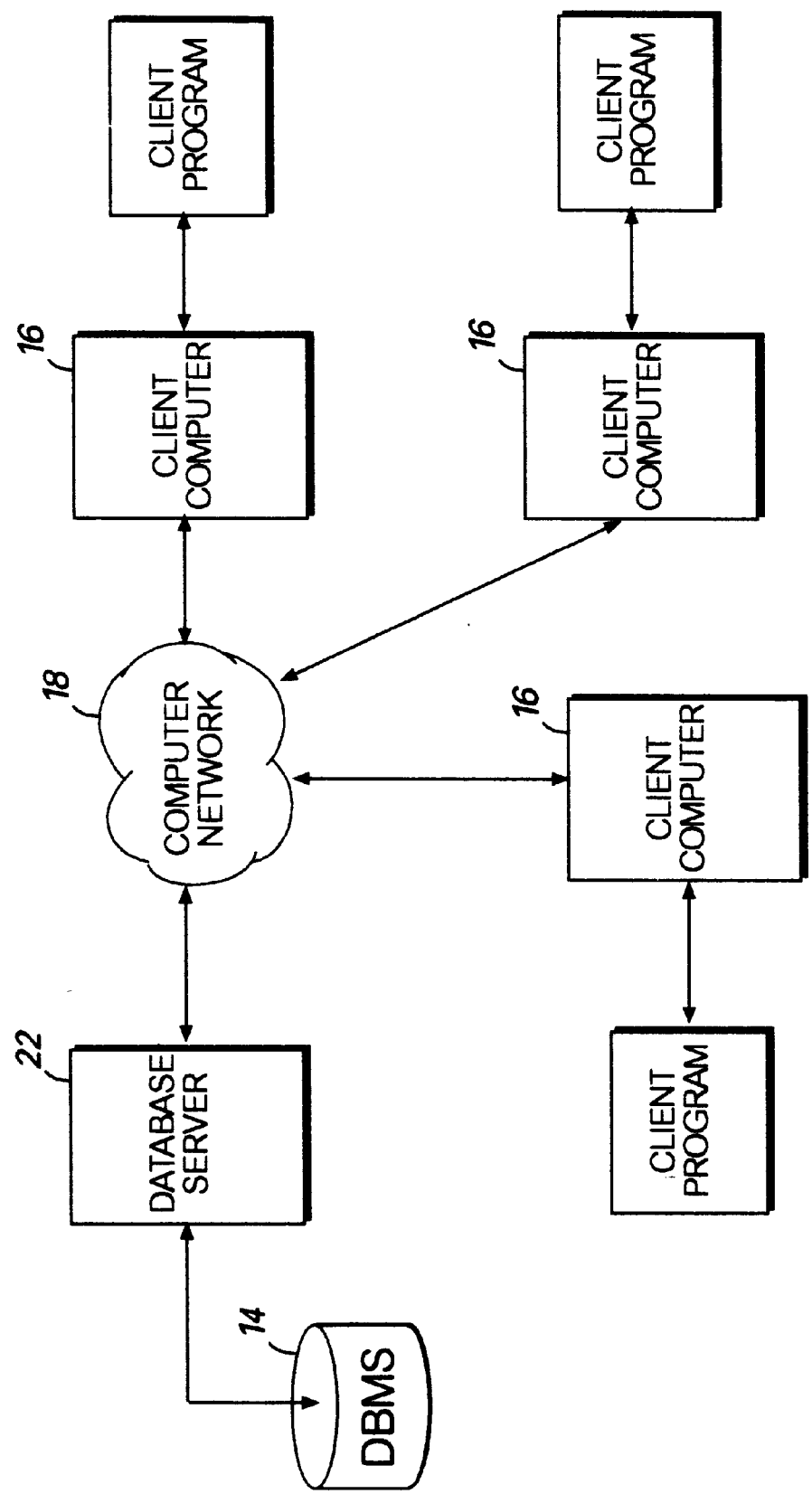
FIG. 1 is a block diagram of a laboratory management system which implements the principles of the present invention.

A system made in accordance with the principles of the present invention is shown in FIG. 1. That system includes a database server 12, a database management system 14, a plurality of client terminals 16, all of which are coupled to database server 12 through a network 18. In the preferred embodiment, database management system (DBMS) 14 manages a relational database to store the calibration laboratory management data. The data records, data tables, and data relationships contained in the database managed by DBMS 14 enable system 10 to provide increased reliability in job tracking and measurement traceability than those provided in previously known systems. Client terminals 16 execute client application programs which communicate with DBMS 14 to query the database managed by DBMS 14 and to provide data for that database.

Figure 2:
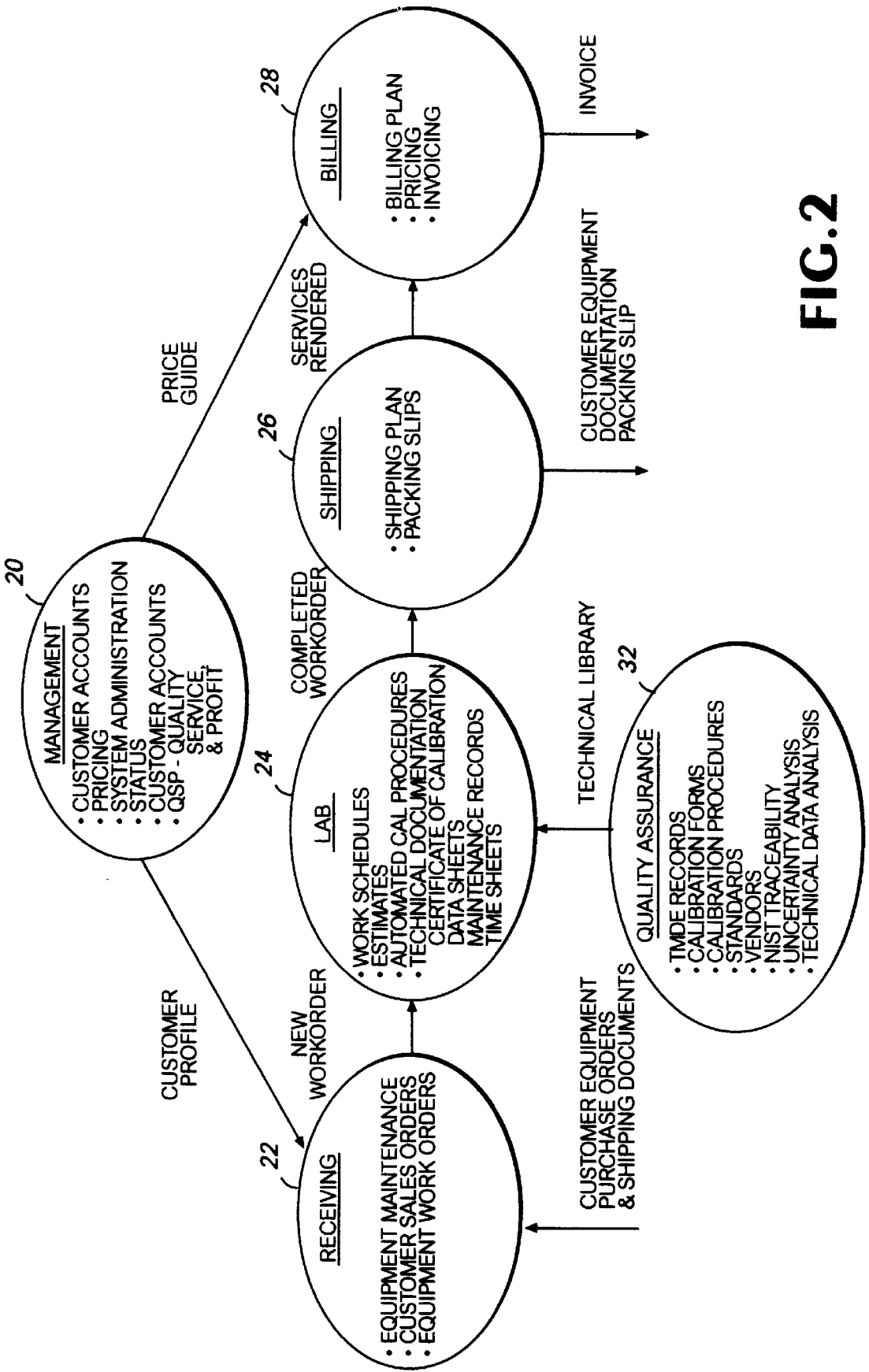
FIG. 2 is a block diagram of the functions performed in a calibration laboratory.

The functions performed in a typical calibration process are shown in FIG. 2. As shown in that figure, the process is comprised of a receiving function 22, a calibration function 24, a shipping function 26, and a billing function 28. Additionally, the management function 20 and quality assurance function 32 provide customer support and technical quality support, respectively. Client application programs for client terminals 16 are preferably provided for each function of the process performed by a calibration laboratory. For example, client program 16 provided in the receiving area may query DBMS 14 to determine whether a test instrument has previously been entered in the system. Client program 16 located in the calibration laboratory allows a technician to retrieve test procedures from DBMS 14 and enter technical data in the technical data tables of the database managed by DBMS 14. Client program 16 located at the shipping function permits a shipping clerk to obtain information about where any test instrument serviced by the laboratory should be shipped. Client program 16 provided for billing function 28 may query DBMS 14 about work done on a test instrument and pricing information for that work so client program 16 may generate an invoice.

In the preferred embodiment of system 10, database server 12 is a computer having sufficient resources to support known DBMSs such as Microsoft SQL Server 6.5, Sybase System 10, or Oracle RDBMS. Additionally, database server 12 supports multi-client access to DBMS 14 over a computer network. Client terminals 16 should at least be sufficient to support an operating system such as Windows 3.1, Windows NT 3.5 or 4.0, Windows 95, Unix or other similar operating systems which are required for the client programs which execute on client terminals 16. Client terminals 16 also support communication coupling of the client programs executing on client terminals 16 to the DBMS language interface of DBMS 14. The language interface may be a native driver for DBMS 14 or a general purpose open database compliant (ODBC) driver. Network 18 is a computer communication network which may be implemented in any of a number of known physical implementations and communication protocols such as Ethernet and Transport Control Protocol/Internet Protocol (TCP/IP) protocol, although other network physical implementations and communication protocols may be used.

One element of the present invention which facilitates job tracking and standard traceability is the use of only one record to identify a test instrument. This is achieved in database 12 by generating a unique equipment tracking record for each test instrument serviced by a calibration laboratory. The equipment tracking records are stored in a equipment tracking table of database 12. Each time a test instrument is serviced by the calibration laboratory, a calibration work order record is generated and linked to the corresponding equipment tracking record for the test instrument. The technical data records which are generated to store technical data generated during calibration of a test instrument include a pointer to the corresponding calibration work order and the technical data records are stored in the technical data table managed by DBMS 14. Also, the administrative data records which are generated to store administrative data for the customer or owner of the test instrument are linked to the corresponding calibration work order and the administrative records are stored in the administrative data table managed by DBMS 14. Preferably, the administrative data records are contained in a sales order record.

Figure 3:
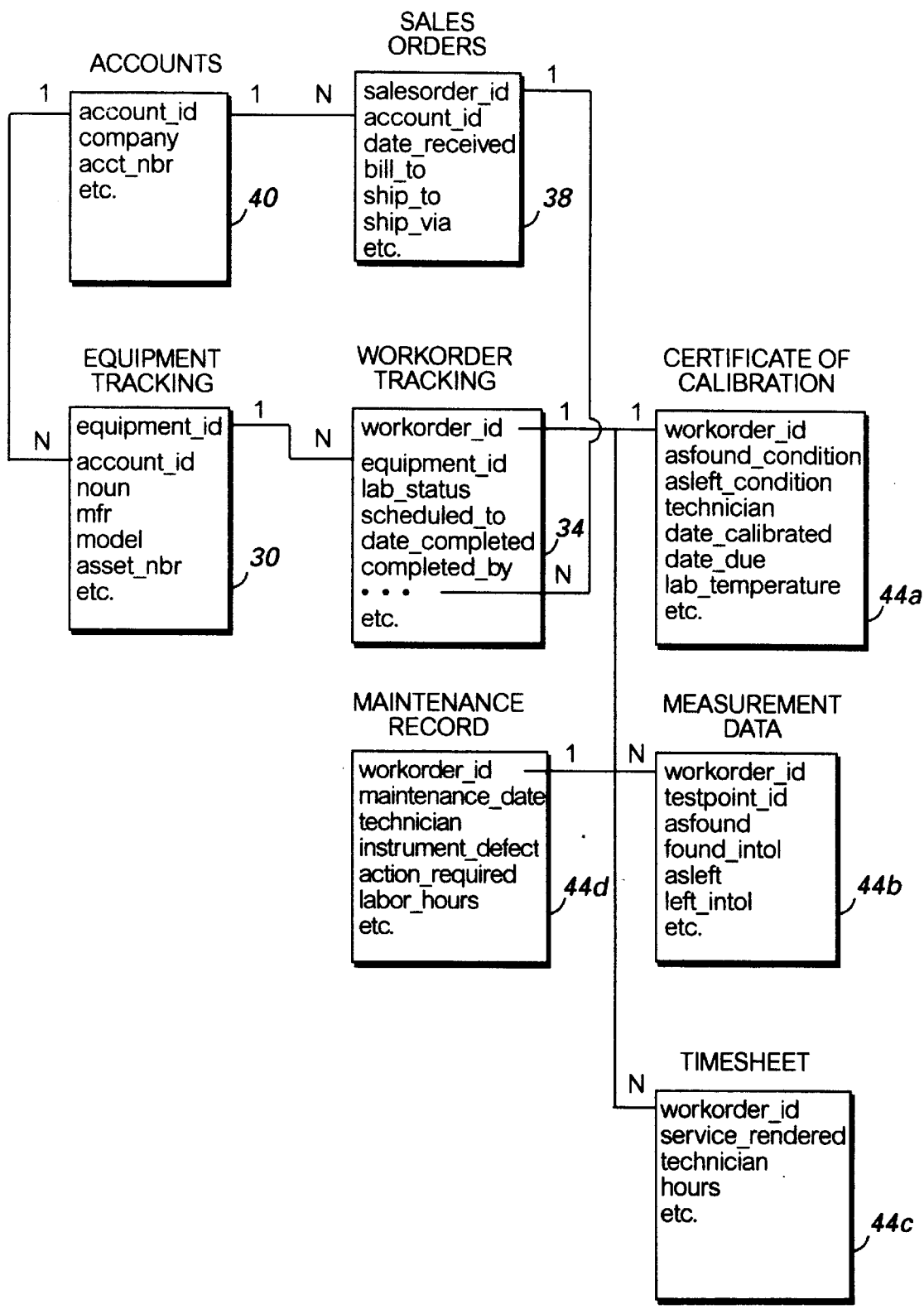
FIG. 3 is a schematic diagram of the 1:N relationship of equipment tracking records to work order records stored in the database of FIG. 1.

A preferred structure of the present invention which demonstrates the linkage of work orders to administrative data and technical data is shown in FIG. 3. As shown in that figure, a single equipment tracking record 30 which identifies a test instrument calibrated by the laboratory is shown linked to a calibration work order tracking record 34. The reader should appreciate that the data fields shown in the records of FIG. 3 are examples only and that other data fields or fewer data fields may be utilized to construct a system or implement the method of the present invention. For purposes of illustration only, work order 34 shows a link to the preferred sales order table which contains administrative data. Multiple work order records 34 may be linked to a single sales order record 38. Calibration work order record 34 is also linked to technical data records 44a–44d. Because the owner of a test instrument probably remains the same for different calibration jobs performed on the test instrument, the administrative data linked to the same equipment record 30 probably include pointers to the same account record 40.

Previously known automated calibration laboratory management systems did not use the structure of one equipment tracking record which may be linked to many calibration work order records. This 1-to-many relationship, sometimes denoted as 1:N relationship, reduces the likelihood of many errors which occur in previously known systems. For example, in previously known systems, each time a test instrument was returned to a calibration laboratory for calibration, a work order record was generated and information about the equipment was entered in the work order record. As a result, the opportunity for typographical errors and other data entry mistakes were possible. These errors in turn, sometimes prevented the generation of a complete job history for a test instrument. Likewise, in previously known systems, the technical data and administrative data were entered in each work order record. As discussed in more detail below, this conversion makes the recovery of technical data for predictive maintenance scheduling more cumbersome and less efficient.

Figure 4:
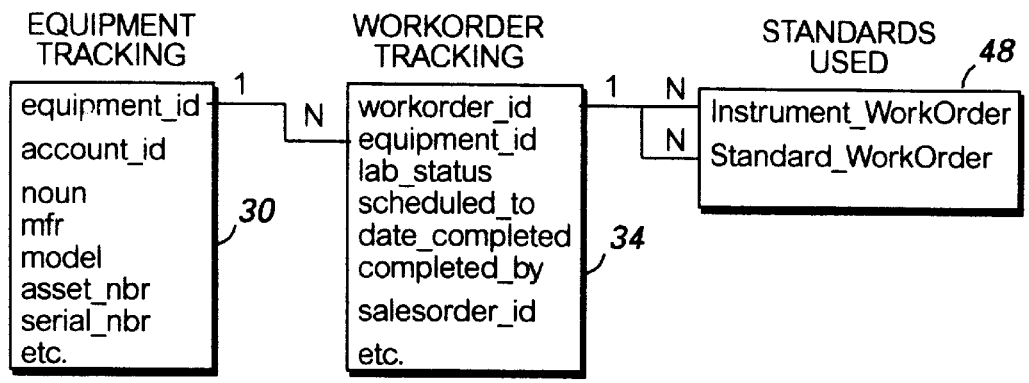
FIG. 4 is a schematic diagram of the relationship between data records stored in the database of FIG. 1 to support laboratory standard traceability.

A database relation used to improve the measurement traceability of the present invention is shown in FIG. 4. As shown in the figure, an equipment tracking record 30 is linked to a calibration work order record 34 which is linked to a standards used record 48. In the preferred implementation, the standards used record 48 includes a data field for instrument_work order which is the same as the work order_id of record 34 and it also includes standard_ work order numbers. The standard_work order numbers in a standards used record 48 identifies the most recent calibration work order record 34 for a calibration standard used to perform the calibration procedure on the test instrument. In order for this information to be available in the system, each calibration standard used by the calibration laboratory is entered into system 10 as if it is a test instrument. That is, the initial record for a calibration standard includes an equipment tracking record 30, a calibration work order tracking record 34 and a standards used record 48 which identifies the standards used to calibrate the calibration standard. When the standard_work order data value corresponds to a calibration work order that has is not linked to a standards used record, the calibration standard identified by equipment tracking record 30 is determined to be a primary standard for the laboratory. When the standard_ work order number identifies another calibration work order number in the system, the standard identified by equipment tracking record 30 is a transfer standard. In the preferred implementation shown in FIG. 4, an NIST record is used to identify the NIST number for the test instrument corresponding to the equipment tracking record at the end of the chain.

In order to trace standards for a test instrument certified by the laboratory, the process of FIG. 5 is performed. As shown in that figure, DBMS 14 first locates equipment tracking record 30 for a particular test instrument (Block 100). The most recent calibration work order record 34 corresponding to record 30 is located (Block 104) and the standards used table 48 linked to the located calibrated work order 34 is retrieved (Block 108). The standards used table is searched for a standard_work order data value (Block 110), and if one is located, the corresponding calibration work order record 34 is retrieved (Block 104). The standard_work order data values from the corresponding standards used table for that calibration work order record are then used to search for other calibration work order numbers in the system (Block 108, 110). When a calibration work order record 34 in the chain is not linked to a standards used table containing standard_work order numbers, DBMS 14 determines that the end of the traceability chain has been reached and generates a traceability report for the measurement corresponding to the standard used work order number in the standards used table of the calibration work order record linked to the equipment tracking record for the test instrument (Block 114). The reader should appreciate that the loop represented by blocks 104–110 are preferably implemented using recursive programs. As DBMS 14 recursively unwinds through the calibration work order records 34 traversed during the search, it identifies each standard used to calibrate the test instrument or one of the standards used to calibrate the test instrument. When all of the standards used for one of the standard_work order numbers in a standards used table have been included in the traceability report, the standards used table is searched to determine whether another standard_work order remains to be traced (Block 118). If there is the process continues (Block 104). Otherwise, the process is finished. Because this process uses calibration work order numbers and standard_work order numbers to identify all standards used either directly or indirectly in the calibration of a test instrument, there is no date sensitive information which results in an endless loop as sometimes occurs in previously known automated laboratory management systems.

Figure 6:
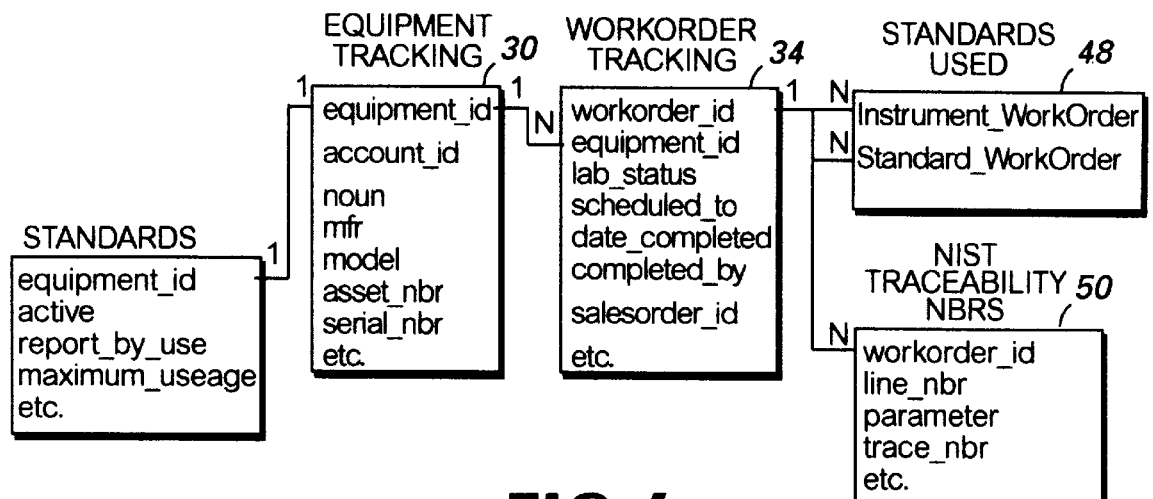
FIG. 6 is a schematic diagram of the preferred relationship between data records stored in the database of FIG. 1 to support laboratory standard traceability.

In a more preferred implementation of the traceability function, the linking structure of FIG. 6 is used. That structure shows an equipment tracking record 30 which is linked to a work order record 34 in a standards used record 48. Additionally, an NIST traceability record 50 is linked to a work order for a primary standard which is calibrated to an NIST standard. The data fields shown to identify the NIST test record number in the NIST traceability record 50 are merely exemplary and other data fields may be used instead.

Figure 7:
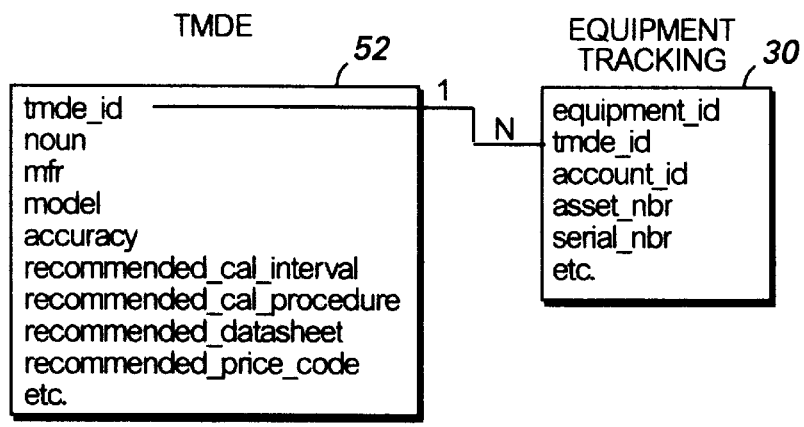
FIG. 7 is a schematic diagram of the preferred relationship of database records stored in the database of FIG. 1 which support retrieval of technical data for a specified type of equipment.

In order to facilitate predictive maintenance scheduling, database server 12 preferably includes a TMDE record 52 such as the one shown in FIG. 7. Again, the information shown in that data record is exemplary only and other types of information may be used to generically define a type of test, measuring, and diagnostic equipment. There exists a 1:N relationship between a TMDE record and equipment tracking record 30. This relationship defines all of the pieces of equipment stored in the system which conform to the generic description of the TMDE record 52. Use of TMDE record 52 permits some of the information previously maintained in equipment tracking record 30 to be stored in TMDE record 52. This further reduces the likelihood of erroneous information being entered into the system as a corresponding TMDE record 52 may be made available at a client 16 for use in generation of an equipment tracking record 30 when a test instrument is first entered into system 10. Additionally, in the preferred implementation, the manufacturer's calibration procedure and a form data sheet may be maintained in a TMDE record. When a technician calibrates a test instrument in a calibration laboratory, this information may be accessed and presented on the technician's client computer to further reduce the number of data fields for which the technician needs to enter data. This information also helps ensure that the technician uses the correct calibration procedure correctly and supplies all of the data required to properly evaluate and report the calibration of the equipment.

Figure 8:
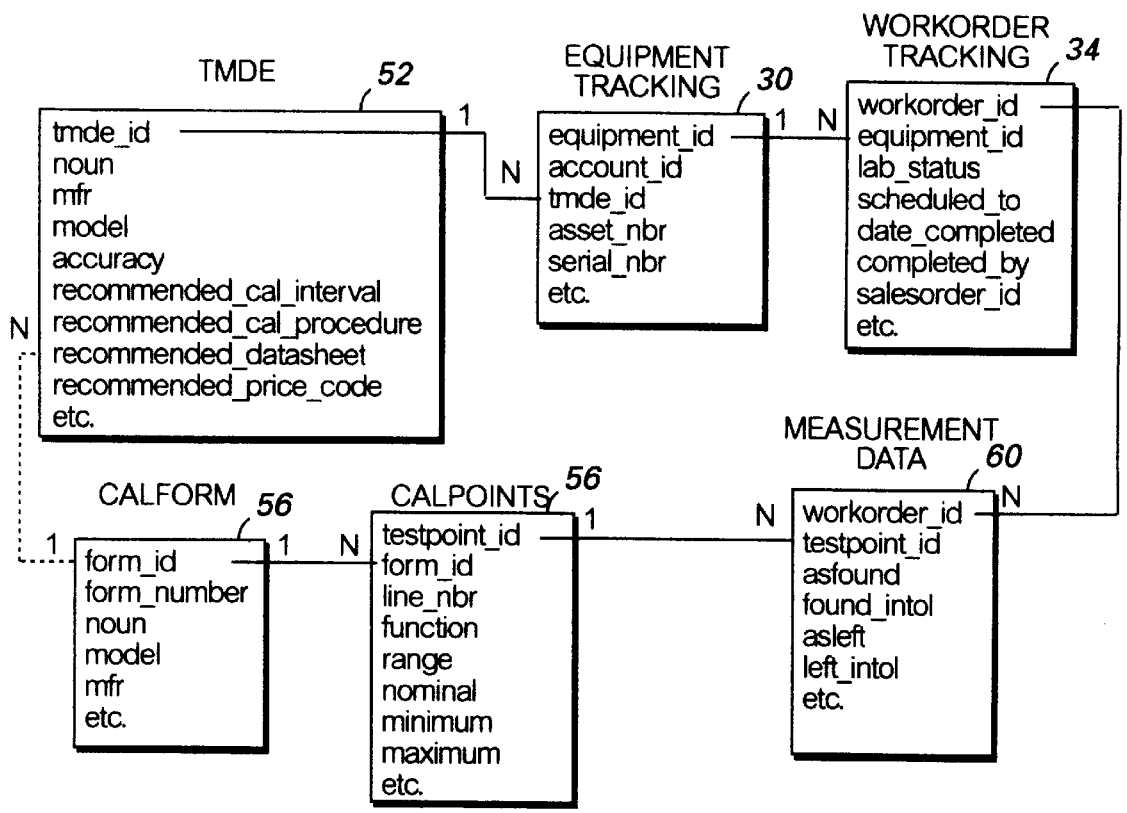
FIG. 8 is a schematic diagram of the preferred relationship of database records stored in the database of FIG. 1 which support measurement data consistency.

In a preferred embodiment of the present invention, the database managed by DBMS 14 includes a calibration form table 56, a calibration test point table 58, and measurement data table 60 as shown in FIG. 8. This structure permits a technician to access the calibration form for a particular type of TMDE equipment by retrieving the appropriate calibration form record 56 through the link with the TMDE form record 52. Each calibration form is linked to the test point identifiers required for completing calibration of the specified test instrument. The test point identifier is linked to a measurement data record 60 in which the technician may record technical data such as the measurement taken at the test point from the equipment as found and the measurement taken at the test point of the equipment as left. Each measurement data record is also linked by a work order identifier to a calibration work order record 34. This structure permits DBMS 14 to locate all of the test point identifiers measured for a calibration work order and the measurement data recorded for each test point. For predictive maintenance scheduling, the TMDE record 52 may be used to locate all measurement data records for one particular test point on a particular type of TMDE equipment. This information is provided through the linkage of the TMDE record 52 to an equipment tracking record 30 to a calibration work order 34 to an measurement data record 60 to a calibration test point record 48. When this information is collected for all equipment records 30 which correspond to the TMDE record 52, all of the measurement data for a particular test point on a particular type of equipment may be obtained.

Figure 9:
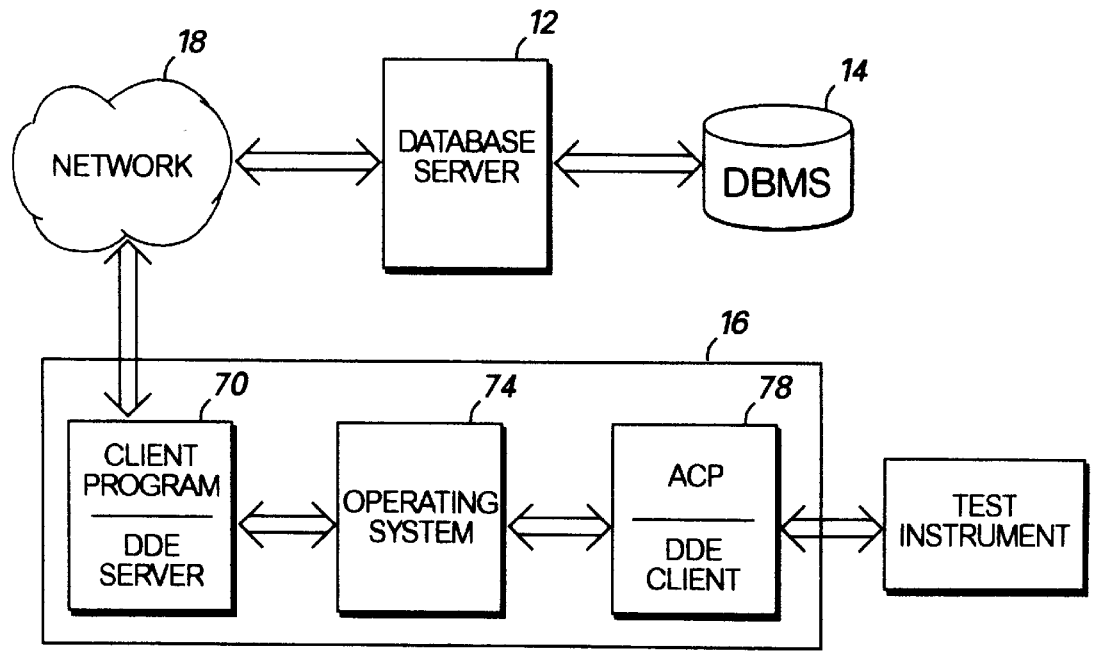
FIG. 9 is a block diagram of a preferred real-time interface for an ACP that can transfer data collected during a calibration procedure to the system of FIG. 1.

A block diagram of a real-time interface for the transfer of technical data from an ACP to DBMS 14 of the present invention is shown in FIG. 9. As shown in that figure, client terminal 16 includes client application 70, operating system 74, and ACP 78. ACP 78 is shown coupled to a test instrument for the collection of data from a calibration job performed in accordance with a calibration procedure. Application program 70 is coupled to database server 12 and DBMS 14 through network 18, although they may be coupled through a point-to-point communication path. ACP 78 may be implemented in a number of test instrument languages such as MetCal which is available from Fluke Instruments.

The process for transferring collected data from an ACP to DBMS 14 is shown in FIG. 10. When ACP 78 is to be used to collect data from a test instrument, a technician activates client program 70 and queries DBMS 14 for the calibration work orders open on the system (Block 150). Using information about the open work orders, the calibration work order that corresponds to the test instrument coupled to ACP 78 is selected (Block 154). DBMS 14 returns a calibration datasheet (Block 158) which client program 70 registers as a server (Block 160). ACP 78 then transfers data collected during performance of a calibration procedure (Block 164) by using operating system commands to output data to its registered server. Preferably, ACP 78 does this by placing a server identifier, a data value, and a location for the data value in the calibration datasheet in a real-time interface with the operating system. Operating system 74 then provides the data and its location to the registered server which puts the data in the corresponding location in the calibration datasheet (Block 168). At the conclusion of the calibration procedure, ACP 78 provides a signal to operating system 74 that the data transfer is complete (Block 170) and client program 70 returns the calibration datasheet populated with data from ACP 78 to DBMS 14 (Block 174). DBMS 14 stores the returned calibration datasheet in its database (Block 178).

In the preferred implementation, operating system 74 on client terminal 16 is a Windows operating system having a Dynamic Data Exchange (DDE) interface for application programs. Client program 70 registers with operating system 74 as a DDE server for ACP 78 and ACP 78 provides a name for the server, the calibration work order identifier, the data, and its location. In order to use the DDE, ACP 78 must be implemented in a DDE compliant language that is compatible with Windows operating systems. Such languages include LabView Graphical programming language from National Instruments, PowerBuilder from Powersoft, and Visual Basic from Microsoft Corporation of Redmond, Wash. Preferably, location of the data in the preferred calibration datasheet is identified by row and column. In the preferred implementation, the row identifier may be any number between one and the last row of the calibration datasheet. The preferred column identifiers are: asfound, asleft, foundin, leftin, and nominal, which correspond to data identifiers well known in the metrology field. Also in the preferred implementation, ACP 78 may request data from the calibration datasheet by identifying a row and a column. In the preferred implementation, the row identifier may be any number between one and the last row of the calibration datasheet. The preferred column identifiers are: asfound, asleft, foundin, leftin, nominal, minimum, maximum, range, and function, which correspond to data identifiers well known in the metrology field. Additionally, ACP may send a save, itemchanged, or goto command to the DDE server. The save command causes the DDE server to send a calibration datasheet to DBMS 14 for storage on database server 12. The itemchanged command causes the calibration datasheet to compare the data value for the current row/column identifier to the corresponding minimum and maximum data values stored in a calibration form, shown in FIG. 8. The goto command causes the cursor for the calibration datasheet to be moved to a new row.

In use, client programs are installed on computers in the various functional areas for a calibration laboratory and DBMS 14 and its related database schema are loaded on database server 12. Clients and database server 12 are coupled together through computer network 18. Preferably, calibration standards for the calibration laboratory are then entered into the database of database server 12. Upon receipt of a test instrument, client program 16 in the receiving function generates a sales order for the administrative account data for the customer. When a test instrument is received, an equipment tracking record 30 is generated, if one does not already exist in the system. When a test instrument is moved to the laboratory, the technician may access calibration forms, calibration procedures, and calibration data sheets to enter measurement data for test points. If the test instrument is brought within calibration, the calibration certificate may be generated from the system. The test instrument and its calibration certificate are then sent to shipping. The client program in the shipping area accesses the administrative data contained in the sales order to prepare packing slips and shipping orders for the test instrument. Additionally, client program 16 in the billing area generates an invoice for the services rendered by the calibration laboratory and the invoice is sent to an address indicated by the customer administrative data contained in the sales order.

Should a customer desire measurement traceability for a test instrument, a client program and a quality assurance function may be used to locate the latest calibration work order for the test instrument. The calibration work order may then be used to access a standards used record 48. The standard_work order numbers are recursively transversed to locate a calibration work order record for which its corresponding standards used table contains no standard_work order records. A report listing all of the standards used in the traceability chain may be generated to provide a customer with a traceability report.

While the present invention has been illustrated by the description of the preferred and alternative embodiments and while the embodiments have been described in considerable detail, it is not the intention of the applicants to restrict or anyway limit the scope of the appended claims to such detail. Additional advantages and modifications will readily appear to those skilled in the art. The invention's broader aspects are therefore not limited to the specific details, represented apparatus and method, an illustrative example shown and described. Accordingly, departures may be made from such details without departing from the spirit or scope of applicant's general inventive concepts.

What is claimed is:

1. A system for managing calibration laboratory data comprising:

a database server for managing a database comprised of an equipment tracking table containing equipment tracking records, each equipment tracking record having an unique equipment identifier for each test instrument serviced by a calibration laboratory and a work order table containing calibration work order records having at least a calibration work order identifier that uniquely identifies a calibration job performed by the calibration laboratory, a plurality of said calibration work order records being linked to one of said unique identifiers for one of said test instruments serviced by the calibration laboratory so that equipment identification data for a test instrument is only entered once in the system for all calibration jobs performed on the test instrument; and at least one client terminal for receiving data generated during calibration of a test instrument and communicating the received data with the database server so that the database server stores the received data within the equipment tracking records and the calibration work order records.

2. The system of claim 1 wherein the client terminal receives technical data generated during calibration of a test instrument and administrative data for a customer corresponding to the test instrument; and the database server stores the technical data received from the client terminal in technical data records a technical data table; and the administrative data received from the client terminal is stored in administrative data records in an administrative data table; and said technical data table records and said administrative data table records for one of the calibration jobs performed by the calibration laboratory are linked to one of said equipment tracking records in said equipment tracking table by said calibration work order record having said calibration work order identifier that identifies one of said calibration jobs performed on said test instrument so that said administrative data records and said technical data records for each said calibration job performed by the calibration laboratory are maintained separately in the system.

3. The system of claim 2 wherein said database server stores unique test, measuring and diagnostic equipment (TMDE) identifiers for each type of test instrument and calibration standard stored in said system, the TMDE identifiers being stored m the TMDE records contained in a TMDE table so that technical data in said technical data tables for each test instrument and each calibration standard which corresponds to one of said TMDE identifiers may be retrieved and analyzed.

4. The system of claim 1 wherein the database server stores standards work order identifiers and calibration work order identifiers in standards used records contained in a standards used table so that laboratory standards used for a calibration job on a test instrument may be traced by using standards work order identifiers and calibration work order identifiers without reference to date information.

5. The system of claim 4 wherein said database server stores unique equipment identifiers for standards used by the calibration laboratory in the equipment tracking records in said equipment tracking table;

said database server stores technical data for calibration jobs performed on said standards in the technical data records in said technical data table;

said database server stores administrative data for a calibration laboratory in administrative data records in said administrative data table; and said database server links one of said calibration work order records in the work order table to one of said standards used records in said standards used table for each calibration work order identifier so that each laboratory standard used for a calibration job is linked to one of said calibration work orders stored in said work order table by its standards work order identifier whereby each laboratory standard may be traced to one of another laboratory standard and a "golden mean".

6. The system of claim 5 wherein said database server links one of said calibration work order records in said work order table to:

a National Institute of Standards and Technology(NIST) standard record for identifying a NIST report corresponding to an equipment tracking records linked to said NIST record.

7. The system of claim 1 said client terminal further comprising:

an automated calibration procedure (ACP) having a real-time interface for sending data collected during a calibration job to a technical data record corresponding to said calibration work order record having a work order identifier that links said work order record to one of said equipment tracking records corresponding to the test instrument from which said technical data was collected.

8. The system of claim 7 wherein said real-time interface of said client terminal forwards technical data received from said ACP to said database server for maintaining the database containing said equipment tracking table and said work order table.

9. The system of claim 8 wherein said client terminal includes a Dynamic Data Exchange (DDE) server in which technical data collected during a calibration job is stored.

10. A method for managing calibration laboratory data comprising the steps of:

linking an equipment tracking record having an unique equipment identifier for a test instrument serviced by a calibration laboratory to a plurality of calibration work order records, said calibration work order records having at least a calibration work order identifier that uniquely identifies each calibration job performed by the calibration laboratory for the test instrument.

11. The method of claim 10 further comprising the steps of:

separately linking technical data records generated from one of the calibration jobs for the test instrument and administrative data records for a customer that send the test instrument to the calibration laboratory for the calibration jobs so that said administrative data records and said technical data records for each calibration job performed on the test instrument are separately maintained.

12. The method of claim 10 further comprising the steps of:

linking a standards used record having standards work order identifiers and calibration work order identifiers to each calibration work order in said plurality of work orders so that calibration standards used for one of the calibration jobs on the test unit may be identified by one of said standards work order identifiers in said standards used record.

13. The method of claim 12 further comprising the steps of:

generating equipment tracking records having unique equipment identifiers for calibration standards used by the calibration laboratory; and linking each said equipment tracking record for said calibration standards to at least one calibration work order record and a corresponding standards used record so that instrument standards used to calibrate one of said calibration standards identified by one of said equipment tracking records may be traced to a golden mean.

14. The method of claim 13 further comprising the steps of:

linking a National Institute of Standards and Technology (NIST) standard records to said work order record for one of said equipment tracking records corresponding to one of said calibration standards to identify a NIST report for said calibration standard.

15. The method of claim 10 further comprising:

linking a test, measuring and diagnostic equipment (TMDE) record having unique TMDE identifiers for each type of test unit and calibration standard stored by said method to a plurality of equipment tracking records so that technical data collected for calibration jobs performed on said test instruments corresponding to said equipment tracking records in said plurality may be retrieved and analyzed for predictive maintenance scheduling.

16. The system of claim 10 further comprising the steps of:

sending technical data collected during a calibration job by an automated calibration procedure (ACP) in real-time to a technical record linked to said work order record having a work order identifier that links said work order record to one of said equipment tracking records corresponding to the test unit from which said ACP collected the technical data.

17. The method of claim 16, further comprising the steps of:

forwarding the technical data received from said ACP to a database server which stores said technical records in a relational database.

18. The method of claim 16 wherein said sending step is comprised of the steps of:

sending the technical data to a Dynamic Data Exchange (DDE) server; and forwarding the technical data from the DDE server to a database server.

19. An automated calibration procedure (ACP) for transferring data collected during a calibration procedure in real-time to a laboratory management system comprising:

a client terminal having a real-time interface for transferring data between an operating system and an application program said transferred data including a server identifier, a data value, and a data location;

a client program executing within said client terminal for communicating with a database management system (DBMS) of a database server for a laboratory management system, the client program being identified with said server identifier; and an ACP program executing operating system commands within said client terminal to place said server identifier, a collected data value, and a location for said collected data value in said real-time interface so that said client terminal may transfer said collected data to said client program.

20. The system of claim 19 further comprising:

a calibration datasheet stored within said client terminal; and said client program executing in said client terminal stores said collected data transferred from said ACP in said calibration datasheet at a location corresponding to said location placed in said real-time interface.

21. The system of claim 20 wherein said client program executing within said client terminal is a Dynamic Data Exchange (DDE) server and said operating system commands in said ACP are DDE commands.

22. A method for implementing an automated calibration procedure (ACP) for transferring data collected during a calibration procedure in real-time to a laboratory management system comprising the steps of:

identifying a client program as a server with an operating system, the client program being for communicating with a database management system (DBMS) of a laboratory management system; and transferring data from an ACP to a real-time interface of the operating system with an identifier corresponding to said client program so that the operating system transfers said data from said real-time interface to said client program.

23. The method of claim 22, said transferring data step further comprising the steps of:

identifying a location for said transferred data in said client program.

24. The method of claim 23 further comprising the steps of:

sending a calibration datasheet from the DBMS to the client program; and said location identifying step identifies a location in the calibration datasheet.

25. The method of claim 24 further comprising the steps of:

returning the calibration datasheet having data transferred from the ACP to the DBMS for storage. wherein said client program is a Dynamic Data Exchange (DDE) server for said ACP and said operating system commands in said ACP are DDE commands.

* * * * *